Figure 1:
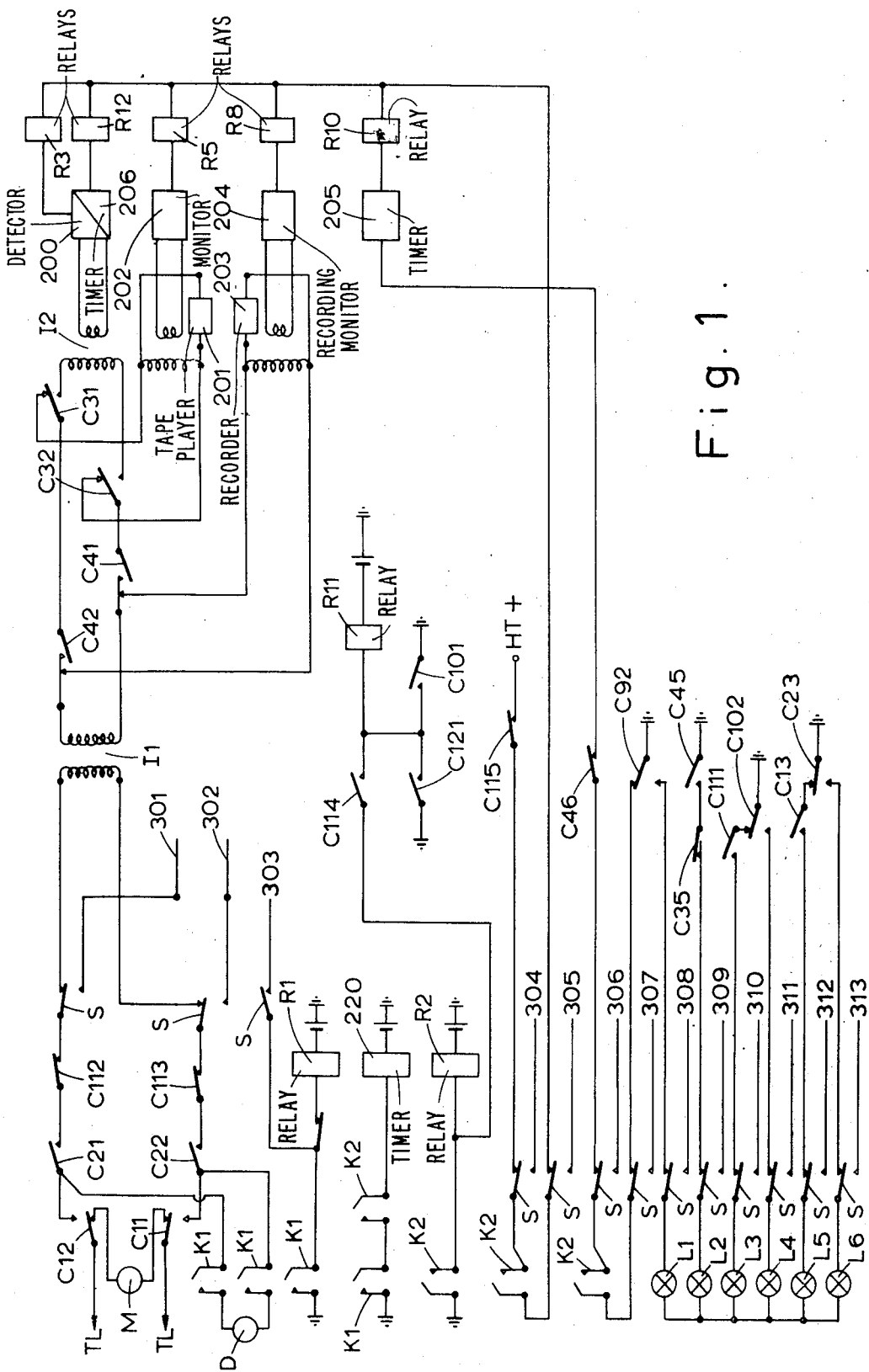
Figure 1A:
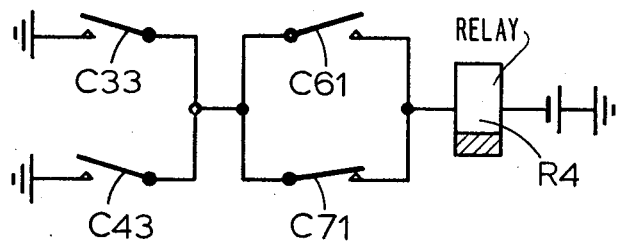
Figure 1B:
Figure 1C:
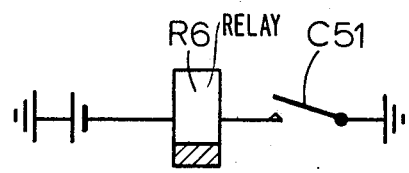
Figure 1D:
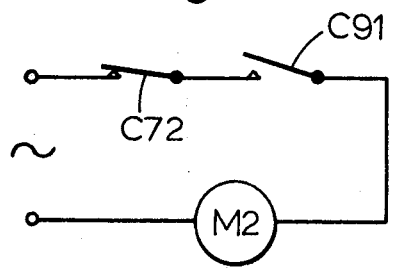
Figure 1E:
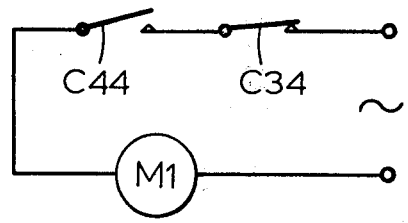
Figure 1F:
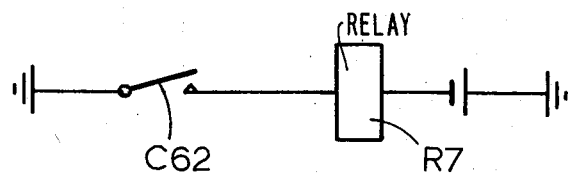

United States Patent [19]
Thorne

[11] 3,999,017
[45] Dec. 21, 1976

[54] TELEPHONE APPARATUS

[76] Inventor: Donald James Thorne, Concourse House, Lime St., Liverpool, England

[22] Filed: Feb. 12, 1975

[21] Appl. No.: 549,281

[30] Foreign Application Priority Data

Feb. 21, 1974 United Kingdom ............... 7991/74

[52] U.S. Cl. ............................................. 179/6 D
[51] Int. Cl.$^2$ .................... H04M 1/26; H04M 1/64; H04M 11/00
[58] Field of Search .................... 179/6 D, 5 P, 6 R

[56] References Cited
UNITED STATES PATENTS

| | | | |
|---|---|---|---|
| 3,105,121 | 9/1963 | Field .................................. | 179/6 D |
| 3,301,958 | 1/1967 | Blakeslee et al. ................. | 179/6 D |
| 3,445,601 | 5/1969 | Whirely et al. .................... | 179/6 D |

Primary Examiner—Vincent P. Canney
Attorney, Agent, or Firm—William R. Liberman

[57] ABSTRACT

An apparatus is provided for transmitting a pre-recorded message to a plurality of destinations via a corresponding plurality of telephone lines. The apparatus comprises a means for storing and transmitting a message, for example a tape recorder. A switching arrangement connects a selected line to the apparatus, and means such as a dialling mechanism are used to call a desired telephone number. When the called telephone is ringing this is detected by a ring tone detector, and when the ringing ceases a switching circuit connects the tape recorder to the called telephone and transmits the pre-recorded message. When the message ceases the selected line is automatically disconnected from the apparatus.

11 Claims, 8 Drawing Figures

TELEPHONE APPARATUS

This invention relates to a telephone apparatus for transmitting a pre-recorded message to a plurality of telephone receivers and, optionally, for recording a reply from the receivers.

According to the present invention there is provided an apparatus for transmitting a pre-recorded message to a plurality of destinations via a corresponding plurality of telephone lines, comprising a message storage and transmission means; first switching means for selectively connecting one of the plurality of telephone lines to the telephone apparatus; destination determination means for determining the desired destination and transmitting the result of the determination via the selected telephone line; a ring tone detector for detecting when the telephone at the said destination is ringing; message detecting means for detecting when a message is being transmitted to the desired line; and automatic switching means actuatable by the said ring tone detector to connect the selected line to the message storage and transmission means when the ring tone ceases, and actuatable by the message detecting means to disconnect the selected line from the message storage and transmission means when transmission of the message ceases.

An apparatus according to the invention may be constructed to operate in one of three ways, referred to below as modes, and in one embodiment is capable of being switched over from one mode to another. If desired the apparatus may be a combination of sub-units each of which operates in its own mode.

In mode 1 the apparatus has $n$ tapes each containing a pre-recorded message (generally the message of each tape is the same) and $n$ tapes for recording incoming messages. The apparatus is capable of dealing with up to $n$ telephone lines simultaneously. In use the operator connects one of the lines to a dial and then dials the telephone number of a desired destination. When a connection is made and the receiver at that destination has been picked up a tape playing machine also connected to that line transmits the message recorded thereon to that destination. When the message has been transmitted the apparatus automatically switches to a condition in which it records the reply from that destination on a recording tape. Once the first dialling operation has been completed the operator can commence a second dialling operation. When the receiver at the second destination is picked up a second tape playing machine transmits the message recorded thereon to that destination. When the message has been transmitted the apparatus automatically switches to a condition in which the reply from the second destination is recorded on a second recording tape. This process can continue until all the lines are in use. When a line becomes free after transmission of a message it can be used again for transmission to another destination.

Mode 2 is the same as mode 1 except that no recording facilities are provided and only transmission of messages occurs.

In mode 3 a single tape playing machine serves $n$ lines. Dialling of successive destinations successively connects the lines to the machine. This has the result that a person picking up the receiver at a destination is likely to break into the transmitted message part of the way through. However the message repeats itself and the length of time for which the message is transmitted to each destination is sufficient to ensure that all destinations receive the whole message.

As mentioned above a single apparatus may contain sub-units operating in different modes. Thus, for example, one might have one group of lines connected to operate in mode 1, and another group connected to operate in mode 3. These could all be served by a single dialling apparatus. Furthermore one could so construct the apparatus that it, or a sub-unit thereof, was capable of operating in more than one mode.

Figure 2:
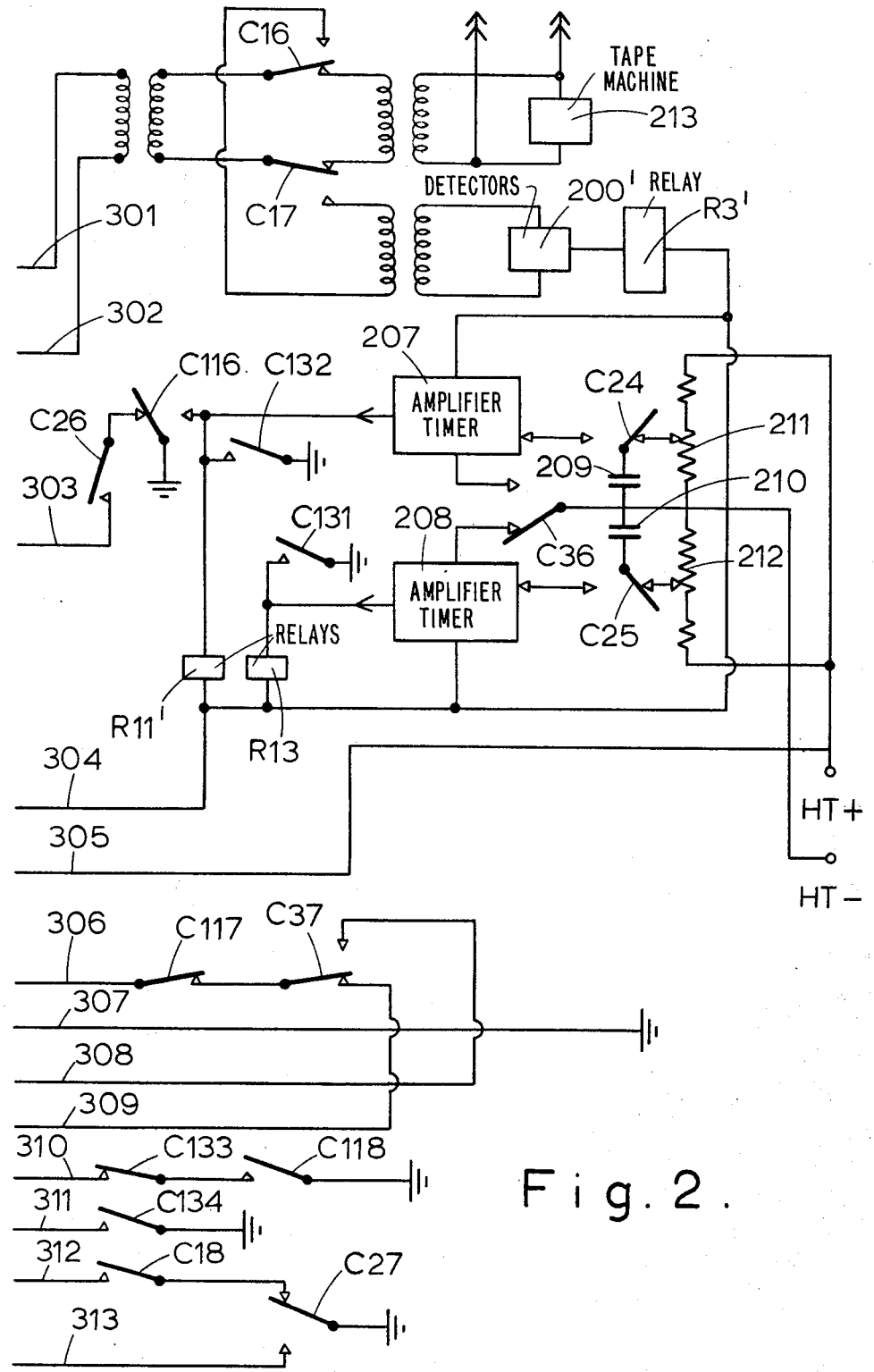

In the accompanying drawings:

FIGS. 1, 1a, 1b, 1c, 1d, 1e and 1f and 2 illustrate together a circuit of an apparatus capable of operating in either mode 1 or mode 3. FIGS. 1, 1a, 1b, 1c, 1d, 1e and 1f illustrate those parts of the circuit which are operative when the apparatus is in mode 1, and FIG. 2 illustrates a circuit which becomes operative (together with part of the circuit of FIG. 1) when the apparatus is in mode B3.

The convention has been adopted in the drawings that where a relay is denoted as RM the contacts operated by that relay are denoted as CMN. For example relay R2 operates contacts C21, C22 and C23.

In FIG. 1 of the drawings TL represents an external telephone line over which messages are to be transmitted and replies received. Contacts C11 and C12 are positioned to connect the external telephone line selectively, to a monitoring telephone M for monitoring the condition of the external telephone line and to the main portion of the telephone apparatus. The contacts C11 and C12 are operated by a relay R1 referred to below. In order to connect the telephone apparatus to the external line the operator closes a key switch K1 which, as indicated, has four contacts. This operates relay R1 whose contacts C11, C12 and C13 thus move from the positions indicated. The contacts C11 and C12 connect the telephone apparatus to the external line and the contact C13 earths a lamp L5 which lights up to indicate that a number may now be dialled.

The operator now dials a number using a dialling apparatus diagrammatically represented at D. The apparatus D, which could be a conventional telephone, also permits the operator to listen in on the line. When a ringing tone is heard the operator operates a key switch K2 which, like K1 also has four contacts. As K1 and K2 are now both closed a meter 220 is operated, the meter functioning to count the number of times each circuit is used to initiate a call. K1 is then restored causing lamp L5 to be extinguished. Operation of K2 operates the relays R2 and R3 which shift contacts C21, C22, C23, C31, C32, C33, C34 and C35 respectively from the positions indicated. Closing of the contact C23 causes lamp L6 to be illuminated indicating that the apparatus is now in use. Closing of the contacts C21, C22 causes the ringing tone present in the external line to be transmitted to the input side of an inductive connection I1. Closing of the contact C33 operates a relay R4 which locks up over one of its own contacts C43. The operation of relay R4 also moves contacts C41, C42, C44, C45 and C46. Closing of the contacts C41 and C42 causes the ringing tone to be transmitted via the inductive connection I1, the already closed contacts C31 and C32 and an inductive connection I2 to a ring tone detector 200. The ringing tone detector 200 holds the relay R3 in a operative condition for as long as the ringing tone is present.

If the called party answers and the ringing tone ceases the relay R3 releases allowing contacts C31, C32, C33, C34 and C35 to return to their normal positions. Movement of the contact C35 causes lamp L2 to illuminate. Movement of contacts C31 and C32 connects the external line to a tape player machine 201, and movement of the contact C34 connects a tape player motor M1 to a source of power via the already closed contact C44. A pre-recorded message on a tape is therefore now transmitted by the machine 201 to the external line. A play monitor 202 detects the presence of an audio frequency signal passing from the machine 201 to the external line. As long as the monitor 202 continues to detect such a frequency a relay R5 is held in operative condition. This operates a contact C51 which operates a relay R6 which in turn closes contacts C61 and C62. Movement of contact C61 completes a hold circuit for the relay R4, and movement of contact C62 operates a relay R7. This in turn opens a contact C71, thus disconnecting the original hold circuits for the relay R4, and opens a contact C72 to prevent false operation of a record motor M2 referred to below. At this stage the relay R4 is held in operative condition via contact C61, the relay R6 being controlled by the contact C51.

When the pre-recorded message has been transmitted and no audio frequency is detected by the monitor 202 the relay R5 releases, after a delay timed to allow for normal pauses in the pre-recorded message. Contact C51 thus returns to normal thereby releasing relay R6, and this in turn causes contacts C61 and C62 to return to normal thereby releasing relays R4 and R7 respectively. Release of relay R7 causes contact R72 to return to normal thus preparing for operation of the motor M2. Release of the relay R4 operates the make-before-break contacts C41 and C42 thereby connecting a tape recording machine 203 to the external line.

If the called party speaks in answer to the transmitted message the audio frequency input is detected by a recording monitor 204 which operates a relay R8. Operation of the relay R8 closes a contact R81 thereby operating a relay R9. This operates contacts C91 and C92 which produce starting of the motor M2 and illumination of the lamp L1 respectively. The motor M2 drives the recording machine 203 which thus records the answering message spoken by the called party.

When the called party ceases speaking the monitor 204 detects the absence of audio frequency input and, after a pause timed to allow for normal pauses in speech, the relay R8 releases, thereby allowing the contact C81 to return to normal. This releases relay R9 which causes contact C91 to return to normal thereby disconnecting the motor M2 from its source of power and thus terminates the recording operation. The contact C92 also returns to normal and thus causes a call-finished timer 205 to become operative via the key switch K2 and the contact C46. After a predetermined delay the timer 205 operates a relay R10 which operates contacts C101 and C102. The contact C102 causes a lamp L4 to illuminate, thus indicating that the call is finished, and the contact C101 operates a relay R11. This operates contacts C111, C112, C113, C114 and C115. Contact C114 locks the relay R11, contacts C112 and C113 disconnect the external line from the main part of the telephone apparatus, and contact C115 disconnections the high tension supply from the apparatus. The operator then restores the key switch K2 to normal thus releasing the relays R2 and R11. The release of relay R2 causes contact C23 to extinguish the lamp L6, thus indicating that the line is again free.

If a called party does not answer within a predetermined time (e.g. 40 seconds) a no-reply timer 206 will operate a relay R12. This closes a contact C121s C121 thus operates the relay R11. This in turn operates contacts C111, C112, C113, C114 and C115, as mentioned previously, except that this time the contact C111 causes a lamp L3 to be illuminated to indicate that no reply has been received. An operator seeing the lamp L3 will clear the call by restoring switch K2 and note the call for a later attempt.

The monitors 200, 202 and 204 are basically similar to one another in construction and may be any device responsive to audio frequencies. Such devices are well known and no further description is believed to be necessary here.

For the sake of simplicity the circuit supplying power to the lamps L1 to L6 has been omitted but it will be understood that this can be a conventional low voltage supply.

For the sake of convenience of reference the following is a summary of the indications given by the lamps when the apparatus is in mode 1:

L1 : Recording
L2 : Play
L3 : No reply
L4 : Call finish
L5 : Dial
L6 : Line busy In FIG. 2 of the drawings lines 301 and 313 inclusive represent the same lines as those denoted by those numerals in FIG. 1 and constitute the connection between the circuit shown in FIG. 2 and that shown in FIG. 1. Line 307 is connected to intermittent earth. In order to bring the circuit of FIG. 2 into operation, and thus switch the apparatus to mode 3, the switch S is operated. It will be seen that the switch S comprises thirteen contacts.

As described above in connection with FIG. 1 the switch K1 is operated, a number is dialled and, when a ringing tone is heard, the relay R2 is operated. Similarly to the operation of FIG. 1 this connects the line TL to a ringing tone detector 200'. A difference from FIG. 1 is the connection of two operational amplifier timers 207 and 208 in the manner shown. When the circuit is in its in-operative state, i.e. before the switch K1 is operated, the timers 207 and 208 are in-operative and a positive voltage is applied to capacitors 209 and 210 associated therewith via variable resistors 211 and 212. In this in-operative state a negative voltage is applied to the timer 208, but there is no connection to positive voltage.

However, when the switch K1 is operated as mentioned above a positive is applied to timers 207 and 208, and to, relays R11', R13 and R3'. (Relays R11' and R3' correspond to relays R11 and R3 in FIG. 1 and when operative operate the contacts operated by relays R11 and R3 as well as the additional contacts in FIG. 2 referred to below). Relay R3' is operated by the ring tone detector 200' and contact C37 to illuminate the lamp L1, thereby indicating that ringing is occurring, and causes, contact C36 to connect the timer 207 to negative high voltage. As the relay R2 has already operated, the timer 207 is connected by the contact C24 to the charged capacitor 209. The capacitor 209 is thus able to discharge through the timer 207, and when the capacitor 209 has reached its uncharged state the timer allows the relay R11' to operate. This will occur if the call is unanswered, i.e. the ringing tone continues, for a predetermined length of time. This in turn operates the contact C116 to cause the relay R1 (see FIG. 1) to cease to operate. The contacts C11 and C12 thus revert to their normal positions and disconnect the apparatus from the external line TL. The contact C116 also locks up the relay R11' and the contacts C112 and C113 further disconnect the apparatus from the line TL. Contact C117 in line 306 disconnects lamp L1 thus indicating that ringing is no longer occurring, and contact C118 closes to cause lamp L3 to illuminate to indicate the absence of a reply.

If, however, the call is answered and the ringing tone ceases before timer 207 has been able to operate a difference course of events is followed. In this case the relay R3' is released causing contact C36 to connect the timer 208 to negative voltage, and causing contacts C16 and C17 to connect a tape machine 213 to the external line TL to permit a pre-recorded message to be transmitted to the line TL. For this purpose a motor is started to drive the tape machine 213, and this can be achieved through the closing a motor circuit (not shown) by a contact not shown operated by release of the relay R3'. Release of contact C37 causes lamp L2 to illuminate to indicate that playing of the message in occurring. The message continues to be transmitted until the capacitor 210 has completely discharged. When this occurs the timer 208 operates the relay R13 to cause operation of contacts C131, C132, C133 and C134. Closure of contact C132 operates relay R11' which then carries out the functions just described in connection with an unanswered call. Opening of the contact C133 disconnects the line to the lamp L3 and closure of the contact C134 cause the lamp L4 to be illuminated to indicate that a call has finished. One operator, seeing lamp L4 illuminated, clears the line by restoring switches K1 and K2 in preparation for further calls.

For the sake of convenience of reference the following is a summary of the indications given by the lamps when the circuit of FIG. 2 is brought into operation:

L1 : Ringing
L2 : Play
L3 : No reply
L4 : Call Finish
L5 : Line dial
L6 : Line busy It will be observed that these are slightly different to the indication given when the circuit of FIG. 2 is not in operation.

A full description of an apparatus operating in mode 2 has not been given as it could simply consist of the apparatus of FIG. 1 without those parts needed to enable it to record incoming messages.

The double arrowed lines leading from the tape machine 213 indicated the connection of this machine to other circuits similar to that illustrated to FIG. 2, so that the tape machine cab be used to transmit a message to a number of different destinations simultaneously.

What I claimed is:

1. A telephone apparatus capable of simultaneously transmitting pre-recorded messages to a plurality of destinations via a corresponding plurality of telephone lines, comprising: a plurality of message storage and transmission devices; first switching means for selectively connecting one of the plurality of telephone lines to the telephone apparatus; a single destination determination means for determining the desired destination and transmitting the result of the determination via the selected telephone line; a ring tone detector for detecting when the telephone at the said destination is ringing; and automatic switching means actuatable by the said ring tone detector to connect the selected line to a message storage and transmission device when the ring tone ceases, and also actuatable to disconnect the selected line from the message storage and transmission device when transmission of the message ceases, the said first switching means and automatic switching means being operable to successively connect each line to the destination determination means and to a different device without affecting previous line-to-device connections.

2. An apparatus as claimed in claim 1, comprising a message detecting means for detecting when a message is being transmitted to the selected line, the said message detecting means being operable to disconnect line from the message storage and transmission means when transmission of the message ceases.

3. An apparatus as claimed in claim 1, further comprising a plurality of recording devices corresponding in number to the number of the said devices, and additional switching means for connecting each recording device to a corresponding line, the said additional switching means being actuatable by the said message detecting means when the message detecting means detects that transmission of the stored message has ceased and an incoming message is being received over the said line.

4. An apparatus as claimed in claim 3, wherein each recording device is a magnetic tape.

5. An apparatus as claimed in claim 1, wherein the message storage and transmission means comprises a further storage and transmission device which contains a single message, the said device being capable of connection at a given time to a plurality of telephone lines, and wherein a mode selection switch is provided for selectively making operable the first mentioned plurality of storage and transmission devices and the said further storage and transmission device.

6. An apparatus as claimed in claim l, wherein automatic indicators are provided to indicate the condition of operation of the apparatus.

7. An apparatus as claimed in claim 1, wherein the destination determination means is a telephone dialling mechanism.

8. An apparatus as claimed in claim 1, wherein the message storage and transmission means comprises at least one magnetic tape.

9. A telephone apparatus capable of overlappingly transmitting a pre-recorded message to a plurality of destinations via a corresponding plurality of telephone lines, comprising: a single message storage and transmission device having means for being connected to a plurality of telephone lines; first switching means for selectively connecting one of the plurality of telephone lines to the telephone apparatus; a single destination determination means for determining the desired destination and transmitting the result of the determination via the selected telephone line; a ring tone detector for detecting when the telephone at the said destination is ringing; and automatic switching means actuatable by the said ring tone detector to connect the selected line to the message storage and transmission device when the ring tone ceases, said first switching means and automatic switching means being operable to successively connect a different line to the destination determination means and to the device without affecting previous line-to-device connections.

10. An apparatus as claimed in claim 9, wherein the destination determination means is a telephone dialing mechanism.

11. An apparatus as claimed in claim 9, wherein the message storage and transmission device comprises at least one magnetic tape.

* * * * *